United States Patent
Fisher

[15] 3,646,778
[45] Mar. 7, 1972

[54] SEALED-TYPE UNIVERSAL JOINT

[72] Inventor: Leslie George Fisher, Birmingham, England

[73] Assignee: G.K.N. Birfield Transmissions Limited, Erdington, Birmingham, England

[22] Filed: Apr. 20, 1970

[21] Appl. No.: 29,882

[30] Foreign Application Priority Data

Apr. 22, 1969  Great Britain.....................20,371/69

[52] U.S. Cl..................................................64/32, 29/434
[51] Int. Cl...........................................................F16d 3/84
[58] Field of Search................................................64/21, 32

[56] References Cited

UNITED STATES PATENTS 3,106,077  10/1963  Sharp.........................................64/21

Primary Examiner—Edward G. Fovors
Attorney—Spencer and Kaye

[57] ABSTRACT

One end of the bore formed in the cylindrical outer member of a universal joint of the kind which includes torque-transmitting balls located in oppositely facing grooves in the inner and outer members is closed by a closure plate which is held in engagement with an end face of the outer member by mechanical interlocking engagement with thread formations on attachment fasteners for securing the outer member to a flange on the drive line of a vehicle.

3 Claims, 3 Drawing Figures

PATENTED MAR 7 1972　　3,646,778

INVENTOR.
Leslie George Fisher

BY　Spencer & Kaye
ATTORNEYS.

SEALED-TYPE UNIVERSAL JOINT

BACKGROUND OF THE INVENTION

1. Field of the Invention

This invention relates to universal joints of the kind which include an outer member formed with a bore in which an inner member is located, the inner and outer members being formed with cooperating formations which, together with torque-transferring elements engaging therebetween, provide a drive connection between the inner and outer members.

2. Description of the Prior Art

In one previous proposal to provide a universal joint of the kind set forth which is sealed, one end of the outer member has been bolted direct to a flange on the drive line of a vehicle with a suitable sealing ring therebetween. In carrying out this method of assembly the joint has had to be assembled dry and thereafter filled with lubricant.

An alternative proposal for providing a universal joint of the kind set forth which is sealed has included mounting a disc or drawn cup or like closure element in a counterbore formed in one end of the outer member and this has necessitated not only the counterboring operation but also the mounting of the fixing studs or bolts by which the outer member is connected to its associated driving or driven member on a greater pitch circle diameter than would be the case were there no counterboring. There is thus a consequent increase in the outside diameter of the outer member and thus of the joint as a whole with an attendant increase in the cost of the joint.

It is accordingly an object of the invention to provide an improved universal joint of the kind set forth which is sealed in such way that filling with lubricant need not be carried out after assembly of the joint in the drive line and which does not involve an increase in the outside diameter of the outer member of the joint.

SUMMARY OF THE INVENTION

Threaded attachment fasteners project from one end face of the outer member of the joint and a closure plate having apertures on the same pitch circle diameter as said threaded attachment fasteners is mounted on said fasteners so as to close one end of the bore in the outer member and the surround of each aperture in the closure plate has mechanical interlocking engagement with the thread of the associated fastener.

DESCRIPTION OF THE PREFERRED EMBODIMENT

Figure 1:
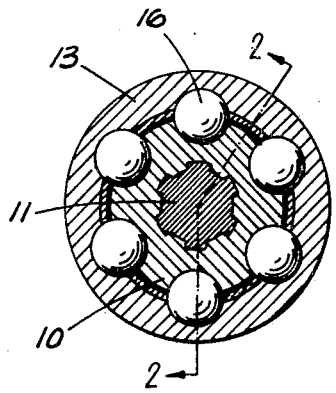
FIG. 1 is a transverse sectional view of a universal joint of the kind set forth.
Figure 2:
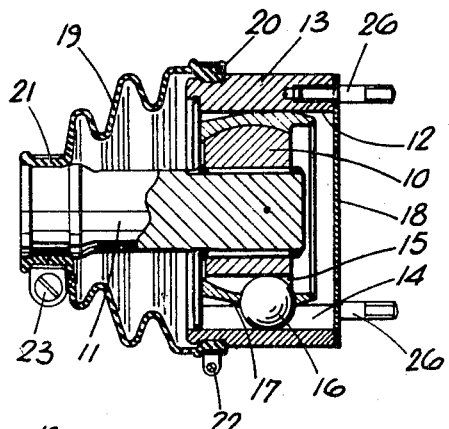
FIG. 2 is a longitudinal sectional view of the universal joint taken along the line 2—2 of FIG. 1

The universal joint shown in the drawing includes an inner member 10 which has a splined connection with a drive shaft 11. The inner member 10 is contained within a through bore 12 in the outer member 13 of the joint and the outer member 13 has a cylindrical inner surface formed with grooves 14 which extend parallel to the axis of the outer member 13. The inner member 10 is formed with grooves 15 which extend parallel to the axis of the inner member 10 and torque-transmitting balls 16 are contained in radially opposite grooves 14 and 15. The balls 16 are contained in apertures in a cage 17 which cooperates with the outer surface of the inner member 10 and with the cylindrical inner surface of the outer member 13 to guide the balls 16 into the bisector plane of the joint. The joint is so constructed as to permit both relative angular movement and relative axial movement between the inner and outer members 10 and 13 of the joint, the configuration of the joint components permitting such relative angular and axial movement being, for example, as described in U.S. Pat. No. 3,464,232.

One end of the bore 12 in the outer member 13 is sealed by means of a closure plate 18 and the other end of the bore 12 is sealed by means of a flexible sealing sleeve or gaiter 19 which is of corrugated form and comprises a corrugated body portion and end portions 20 and 21. The one end portion 20 is clamped to the outer member 13 by means of a clamp 22 and the other end portion 21 is clamped to the shaft 11 by means of a clamp 23.

Figure 3:
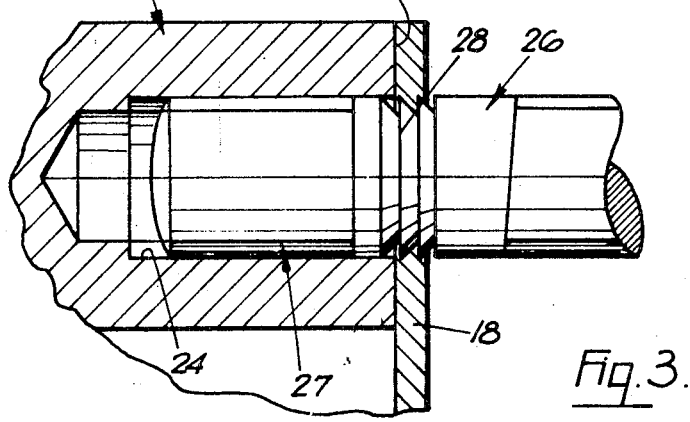
FIG. 3 is an enlarged detail sectional view of part of the universal joint.

The outer member 13 is formed with a series of equiangularly spaced blind bores 24 which open onto that end face 25 of the outer member 13 abutting the closure plate 18. The blind bores 24 receive threaded fasteners which are in the form of fixing studs 26. As shown in FIG. 3 each stud 26 has a shank which is externally threaded and the thread formation on the shank of each stud comprises a first thread portion 27 which is of helical form and a second thread portion 28 which is spaced from the first portion and in which the threads are of circumferential form. In an alternative arrangement the helical thread formation could extend for the whole length of the threaded portion of the shank of each stud 26.

The closure plate 18 has the same outside diameter as the outer member 13 of the joint and is formed with a number of apertures which are equal in number to the bores 24 in the outer member 13 and are correspondingly angularly spaced. Each of said apertures is initially formed so that it has a diameter equal to or substantially equal to the shank diameter of the associated fixing stud 26. A pressing operation is then carried out on the closure plate 18 so as to dish the apertures formed therein so that the effective diameter of each aperture is now slightly greater than the outside diameter of the shank of each stud 26 so that, after the studs 26 have been secured to the outer member 13, the closure plate 18 can be slipped into position so that it is mounted on the studs 26 and is in abutting relationship with the end face 25 of the outer member 13 of the joint.

Prior to assembling the closure plate 18 on the fixing studs 26, a suitable sealing compound can be applied either to the end face 25 of the outer member 13 or to the cooperating portion of that face of the closure plate 18 which will abut said end face 25 or to both so as to provide positive sealing engagement between the abutting surfaces.

After assembly of the closure plate 18 onto the studs 26 projecting from the outer member 13, the outer member 13 and closure plate 18 are subjected to a pressing operation which, in effect, swages the dished surround around each aperture so as to bring this back into the plane of the closure plate 18. This swaging operation forces the surround of each aperture into positive mechanical interlocking engagement with the thread portion 28 of the associated fixing stud 26. The outer member 13 of the joint is thus provided with a fully effective end closure plate without the requirement for any expensive machining operations to be carried out on the outer member 13. The joint can be filled with lubricant prior to assembly onto the drive line of a vehicle and the fixing studs 26 which project beyond the closure plate 18 can be used for attaching the joint to a flange on the drive line. As fixing nuts are tightened onto the studs 26, the flange on the drive line will be drawn into abutting engagement with the outer face of the closure plate 18.

I claim:

1. In a universal joint which includes an outer member formed with a bore, an inner member in said bore, torque-transferring elements between the inner and outer members and cooperating with formations thereon respectively to provide a drive connection between the inner and outer members, threaded attachment fasteners projecting from a face of the outer member at one end of the bore, the axes of said fasteners being circumferentially spaced about the axis of the outer member, and flexible sealing means closing the other end of the bore, the improvement comprising:

a closure plate having apertures spaced apart in correspondence with said threaded attachment fasteners and mounted on said fasteners in a position of closure with respect to said one end of the bore of the outer member, means for securing said plate in said position of closure including a marginal portion of said plate surrounding each aperture therein, and a portion of the thread of its associated fastener, one of said portions being established by deformation in mechanical interlocking engagement with the other, wherein each fastener comprises a shank having a thread formation comprising a screw-threaded portion which engages in a bore in the outer member and a circumferentially threaded portion with which said marginal portion of the associated aperture in the closure plate has said mechanical interlocking engagement.

2. In a method of making a universal joint of the kind which includes an outer member formed with a bore, an inner member in said bore, torque-transferring elements between the inner and outer members and cooperating with formations thereon respectively to provide a drive connection between the inner and outer members, attachment fasteners having threaded shanks projecting from an end face of the outer member at one end of the bore, and flexible sealing means closing the other end of the bore, the improvement comprising the steps of:

forming in a closure plate apertures which are spaced apart in correspondence with said attachment fasteners and which are of substantially the same diameter as the shanks of the fasteners, dishing said apertures so that the effective diameter of each so dished aperture is slightly greater than the diameter of the shank of the associated fastener, assembling the closure plate over said fasteners into a position of closure with respect to said one end of said bore, acting on said assembly of closure plate and fasteners to establish by deformation a mechanical interlocking engagement between a marginal portion surrounding each of the apertures in said closure plate and a portion of the thread of its associated fastener extending through said aperture, said mechanical interlocking engagement serving to hold the closure plate in engagement with said one end face of the outer member so as to close said one end of the bore of the outer member.

3. A method of making a universal joint according to claim 2 wherein, after assembling the closure plate over the fasteners, the closure plate and outer member are pressed together so as to swage the material forming the surround of each aperture into the threads of the fasteners adjacent said end face of the outer member.

* * * * *